(12) United States Patent
Hauser et al.

(10) Patent No.: US 6,588,206 B1
(45) Date of Patent: Jul. 8, 2003

(54) METHOD FOR CONTROLLING FLUID FLOW IN A HYDROSTATIC TRANSMISSION

(75) Inventors: Raymond Hauser, Sullivan, IL (US); Lonnie E. Holder, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 4 days.

(21) Appl. No.: 10/036,835

(22) Filed: Dec. 21, 2001

Related U.S. Application Data

(63) Continuation of application No. 09/627,569, filed on Jul. 28, 2000, now Pat. No. 6,332,317, which is a continuation of application No. 09/223,673, filed on Dec. 30, 1998, now Pat. No. 6,145,312.

(51) Int. Cl.$^7$ ............................................. F16D 39/00
(52) U.S. Cl. ............................. 60/327; 60/468; 60/489; 60/494
(58) Field of Search ...................... 60/327, 468, 494, 60/489

(56) References Cited

U.S. PATENT DOCUMENTS

| | | |
|---|---|---|
| 3,360,933 A | 1/1968 | Swanson et al. |
| 3,593,519 A | 7/1971 | Fuhrimann |
| 3,895,490 A | 7/1975 | Pachins |
| 3,972,189 A | 8/1976 | Knapp et al. |
| 3,973,400 A | 8/1976 | Petersen |
| 4,761,953 A | 8/1988 | Rosman |
| 4,941,320 A | 7/1990 | Kersten et al. |
| 5,438,831 A | 8/1995 | Okada |
| 5,819,536 A | 10/1998 | Mentink |
| 6,122,996 A * | 9/2000 | Hauser et al. ................. 74/607 |

FOREIGN PATENT DOCUMENTS

| | | |
|---|---|---|
| GB | 2112910 | 7/1983 |
| RU | 414380 | 7/1974 |

* cited by examiner

Primary Examiner—Edward K. Look
Assistant Examiner—Michael Leslie
(74) Attorney, Agent, or Firm—Altheimer & Gray

(57) ABSTRACT

A method for providing a bypass for a hydraulic circuit in a hydrostatic transmission enables the user to open or close a bypass between the hydraulic circuit of the transmission and a hydraulic fluid sump. The method uses an electromechanical valve mechanism, and provides an electrical signal thereto to open the bypass and divert the hydraulic fluid from the circuit to the sump.

7 Claims, 21 Drawing Sheets

METHOD FOR CONTROLLING FLUID FLOW IN A HYDROSTATIC TRANSMISSION

CROSS-REFRENCE TO RELATED APPLICATIONS

This application is a continuation of U.S. application Ser. No. 09/627,569 filed Jul. 28, 2000, now U.S. Pat No. 6,332,317, which is a continuation of U.S. application Ser. No. 09/223,673 filed Dec. 30, 1998, now U.S. Pat. No. 6,145,312.

BACKGROUND

This invention relates to a electromechanical bypass for use in a hydrostatic transmission ("HST"). Hydrostatic transmissions are well known in the art, and are more fully described in, e.g., U.S. Pat. No. 5,314,387, which is incorporated by reference herein. This invention can also be adapted for use in an integrated hydrostatic transmission ("IHT") incorporating gearing and axles within a single housing.

In general, an HST has a hydraulic pump and a hydraulic motor mounted in a housing. The pump and motor are hydraulically linked through a generally closed circuit, and both consist of a rotatable body with pistons mounted therein. Hydraulic fluid such as oil is maintained in the closed circuit, and the HST generally has a sump or reservoir from which the closed circuit can draw oil from or dump oil to. This sump may be formed by the housing itself.

The pump is usually driven by an external motive source such as pulleys or belts connected to an internal combustion engine. The pump pistons engage a moveable swash plate and, as the pump is rotated by an input source driven by the external engine, the pistons engage the swash plate. Other HST designs may use a radial piston or ball piston pump and motor design, but the general operation is similar. Movement of the pump pistons creates movement of the hydraulic fluid from the pump to the motor, causing rotation thereof. The motor pistons are engaged against a fixed plate, and rotation of the motor drives an output shaft engaged thereto. This output shaft may be linked to mechanical gearing and axles to drive a vehicle, which may be internal to the HST housing, as in an IHT, or external.

The pump/motor system is fully reversible in a standard HST. As the swash plate against which the pump pistons move is moved, the rotational direction of the motor can be changed. In addition, there is a "neutral" position where rotation of the pump does not create any movement of the hydraulic fluid. However, in most designs this neutral band is very narrow, as it is dictated by the mechanical design of the unit and the user's ability to mechanically locate the neutral area through use of a shift lever or foot pedal system.

The HST closed circuit has two sides, namely a high pressure side in which oil is being pumped from the pump to the motor, and a low pressure, or vacuum, side, in which oil is being returned from the motor to the pump. When the pump direction is reversed, the two sides reverse, with the high pressure side becoming the vacuum side and vice versa. This circuit can be formed as porting formed within the HST housing, or internal to a center section on which the pump and motor are rotatably mounted, or in other ways known in the art. Check valves are often used to draw hydraulic fluid into the low pressure side to make up for fluid lost due to leakage, for example. Such check valves may be located directly in the porting or maybe located in a center section and connected to the closed circuit.

There is a need to have a means to open, or bypass, this closed circuit in certain circumstances. For example, when the vehicle is stopped, the oil in the closed circuit provides hydraulic braking, making it impossible to manually move the vehicle. Mechanical bypass designs are known in the art and are described in, for example, U.S. Pat. No. 5,010,733. Such designs generally achieve bypass by opening the closed hydraulic circuit to the sump by, e.g., opening check valves in the circuit, or by opening a shunt between the high pressure and low pressure sides of the circuit.

However, such prior art designs have drawbacks. For example, in addition to those identified above, a completely open hydraulic circuit can lead to uncontrolled free-wheeling of the vehicle and create significant safety risks. In addition, mechanical bypass mechanisms require various linkages from the HST and IHT to the vehicle, and it can be difficult for the manufacturer of the HST or IHT to accommodate more than one style of actuation of the mechanical bypass.

SUMMARY OF THE INVENTION

This invention addresses the shortcomings in prior HST bypass designs. It is an object of this invention to provide an electromechanical bypass system for a hydrostatic transmission. This invention uses a simple electrical switch which may be triggered in various manners, and a means for creating a bypass condition in response to a first signal from said switch and closing the system in response to a second signal. This bypass may be achieved in a number of different ways, and the switching mechanism could also be of a variety of forms.

It is a further object of this invention to provide an improved HST design which gives the user a wider neutral band, through use of such a switch in connection with the control mechanism of the vehicle to allow the user to put the unit in bypass when the control mechanism is moved to the neutral position. Such a feature may be used in conjunction with or independent of another separate bypass switch.

It is yet another object to provide an improved bypass mechanism which prevents uncontrolled free-wheeling of the vehicle. Additional objects of this invention will be apparent upon review of the detailed description below.

DETAILED DESCRIPTION OF THE INVENTION

Figure 1:
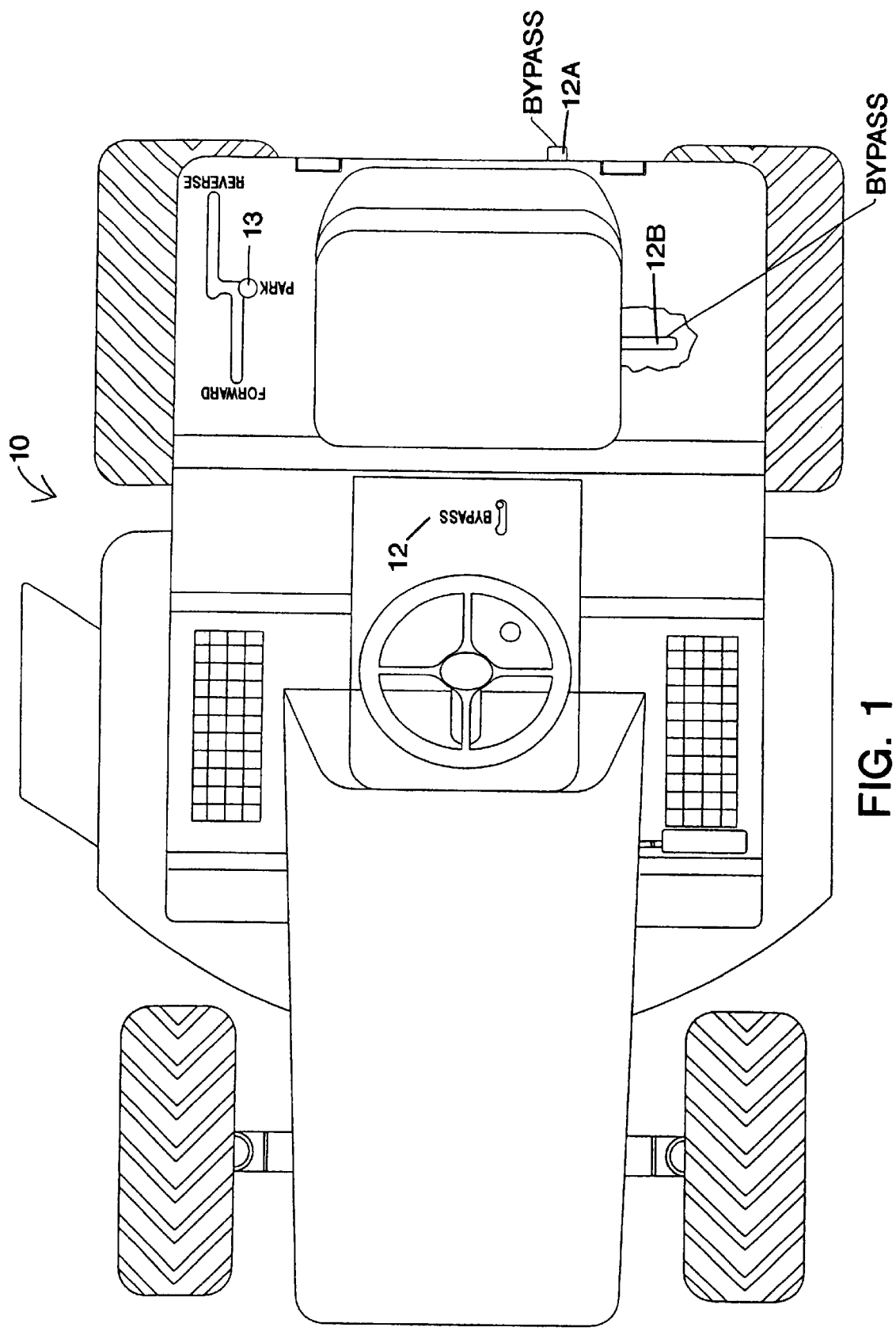
FIG. 1 is a plan view of a tractor incorporating prior art mechanical bypass mechanism.

FIG. 1 is a view of a typical vehicle using a integrated hydrostatic transmission, namely tractor 10, showing various locations of control mechanisms for mechanical bypass units. Different tractor manufacturers have different preferences for location of the mechanical bypass actuator, making it difficult for an IHT manufacturer to design a single unit for all uses without expensive design modifications or use of additional linkages to accommodate such uses. For example, the bypass 12 may be located on the panel immediately in front of the seat. Other manufacturers prefer to have it mounted in location 12A at the rear of the tractor, while others require it to be located under the tractor seat at location 12B. Control lever 13 is generally used to control direction and speed of the vehicle.

Figure 2:
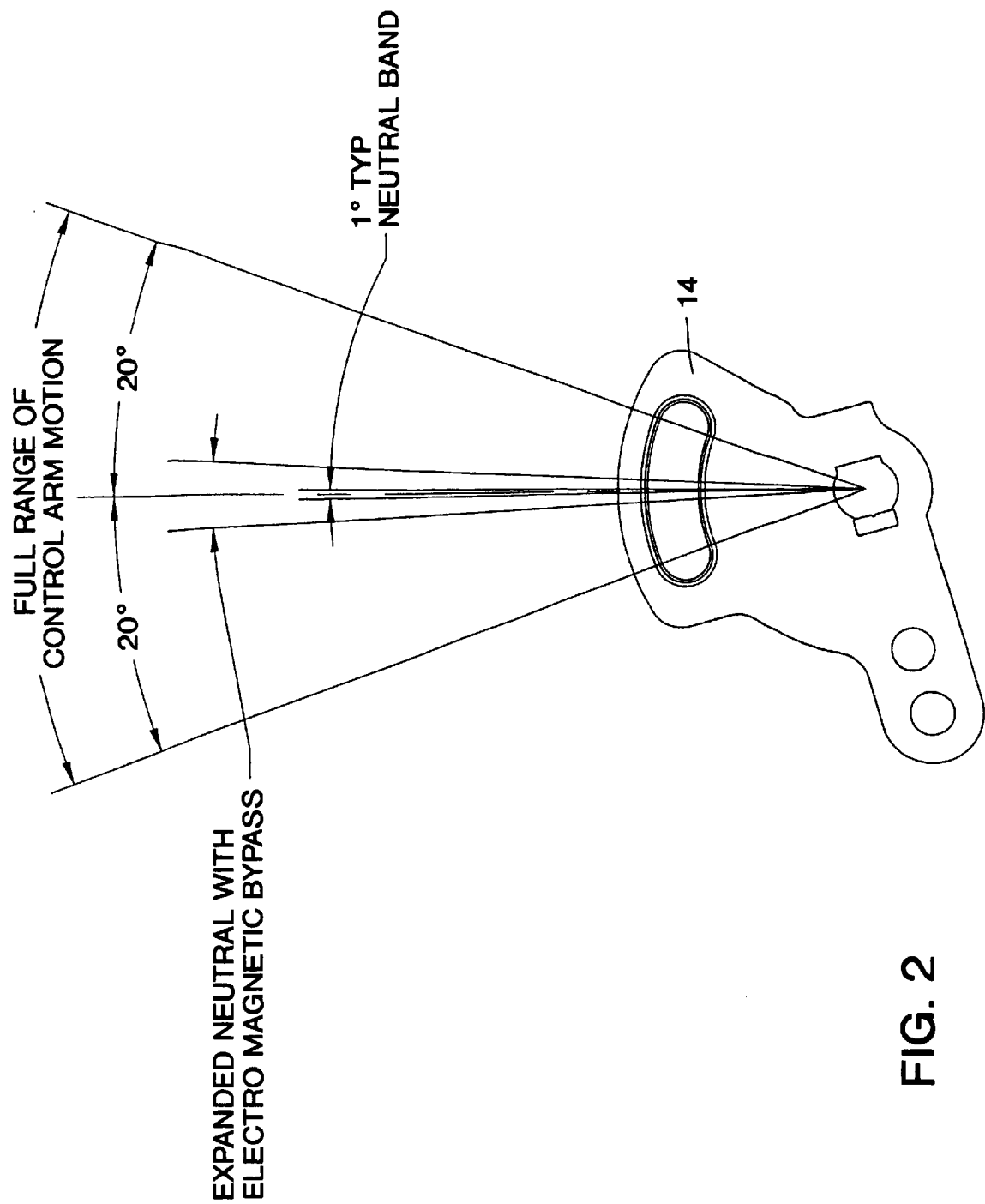
FIG. 2 is a plan view of a control arm used in hydrostatic transmission.

A typical control arm 14 is shown in FIG. 2, and is generally attached to the external housing of the IHT unit. The tractor manufacturer will generally attach its own levers and linkages (not shown) to control arm 14. The typical full range of control arm motion, and the typical neutral band of a prior art HST (of approximately 1°) are shown in FIG. 2. However, due to a lack of control by the IHT manufacturer, it is possible that the tractor manufacturer's linkages may not properly define true neutral, due to manufacturing and design tolerances. Thus, when the user puts the tractor into what is believed to be "neutral," there may be some creepage of the unit, requiring the user to hunt for the actual "neutral" location. An IHT or HST in accordance with the present invention will have an expanded neutral band, as also shown in FIG. 2.

Figure 3:
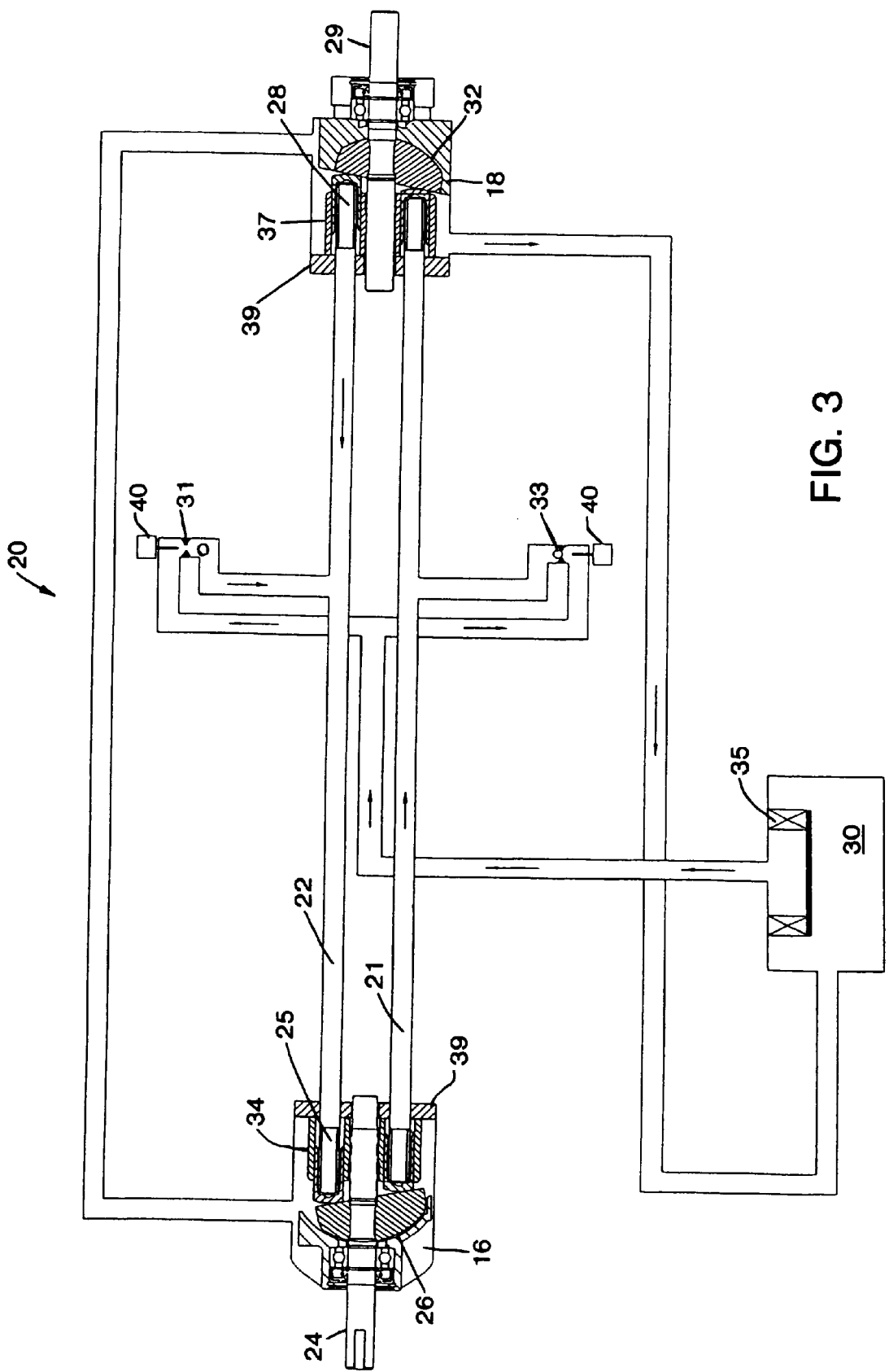
FIG. 3 is a block diagram of one embodiment of the invention.

FIG. 3 is a block diagram of a standard hydrostatic unit showing pump 16 and motor 18, which are connected through a hydraulic transfer system 20 comprising, among other things, high pressure side 21 and low pressure side 22. These sides would reverse upon a change in direction of pump 16. Input shaft 24 is driven by an external motive force (not shown) and acts to rotate pump cylinder block 34. This rotation causes axial movement of pump pistons 25 mounted in pump cylinder block 34, causing the pistons 25 to engage a thrust bearing in moveable swash plate 26. Hydraulic fluid is contained in hydraulic transfer system 20, and is forced via high pressure side 21 to motor 18, where the hydraulic fluid engages motor pistons 28, which are driven against fixed swash plate 32 causing rotation of motor cylinder block 37 and driving output shaft 29.

Hydraulic circuit 20 also comprises sump 30, which can be an integral part of the housing for the IHT. It is understood that sump 30 could also include elements of the transaxle such as a differential and other gearing and the output axles, engaged to the HST through output shaft 29. Hydraulic oil is maintained in sump 30, and during operation of the unit is drawn through filter 35 towards check valves 31 and 33. Check valves are generally known in the art and are used to control flow into or out of a controlled system, and valves 31 and 33 are shown in more detail in other figures. Hydraulic transfer system 20 may comprise porting located in center section 39 on which pump 16 and motor 18 are both rotatably mounted, or it could be integral with the casing for the HST or IHT. Other methods of hydraulically connecting the hydrostatic pump and motor are known in the art and are not intended to be excluded from this description.

In the embodiment shown in FIG. 3, check valve 31 is open as it is connected to low pressure side 22 of the hydraulic circuit. Since check valve 33 is connected to high pressure side 21, the check ball of valve 33 is seated, thus closing the valve. This design is generally used to bring fluid into the low pressure side to make up for fluid lost from the closed circuit due to, e.g., leakage. In one known prior art bypass design, motor cylinder block 37 is mechanically lifted off its running surface on center section 39 to allow fluid to exit the closed circuit quickly and return to sump 30.

Figure 4:
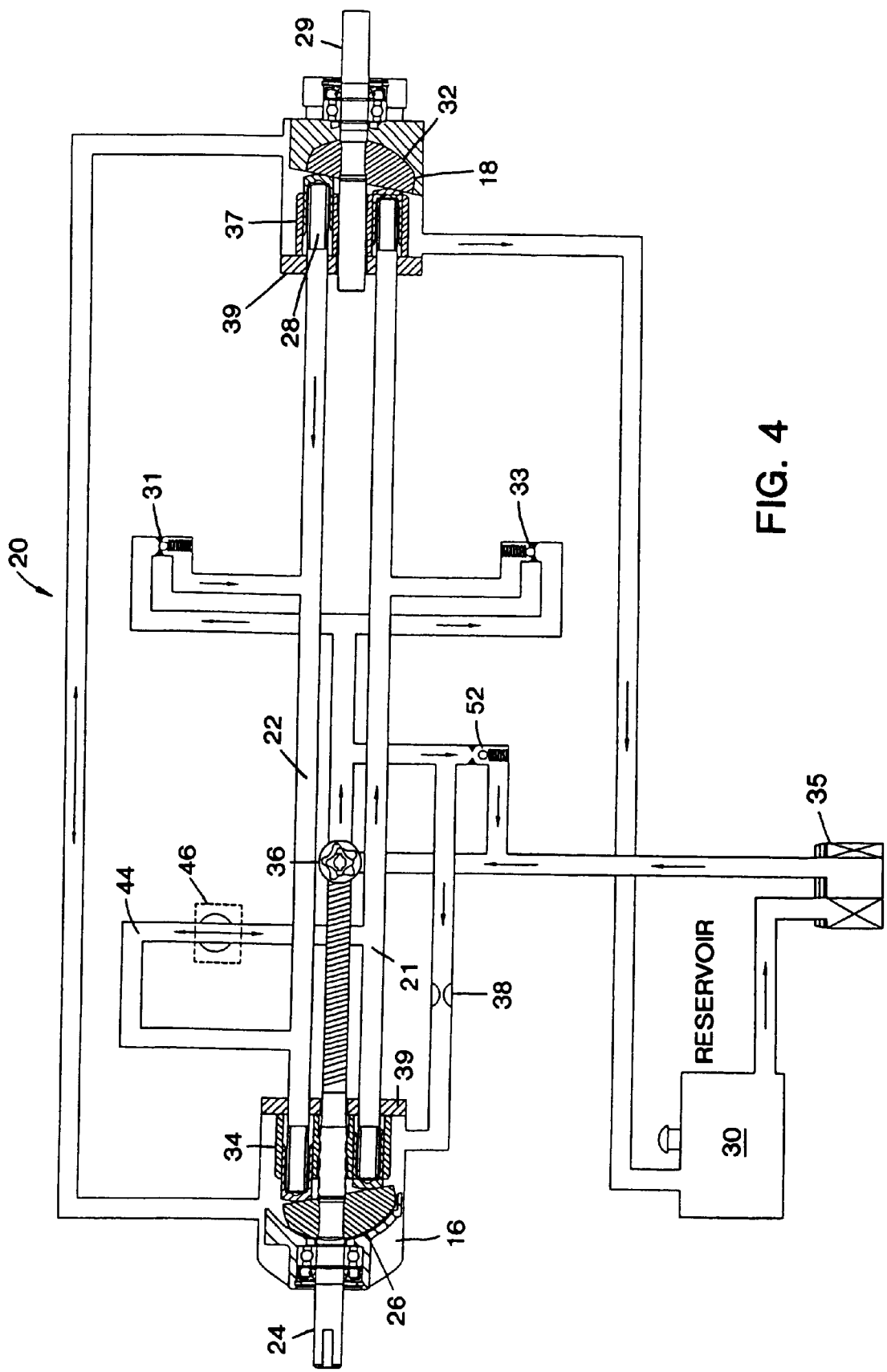
FIG. 4 is a block diagram of another embodiment of the invention.
Figure 5:
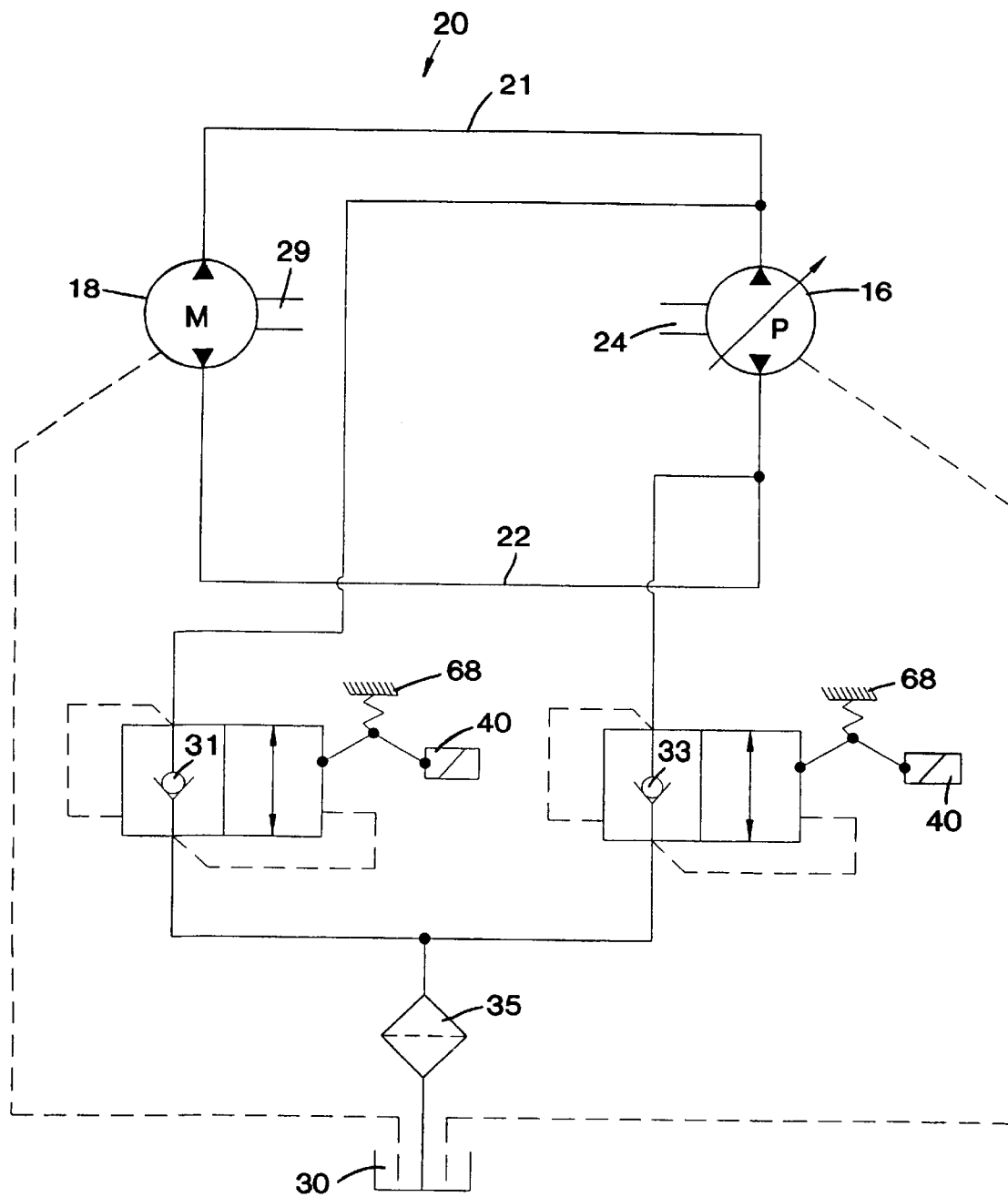
FIG. 5 is a hydraulic schematic of an embodiment of this invention.

Also shown in FIG. 3 is electromechanical bypass 40, which can be triggered by a signal generated in some manner to open check valves 31 and 33 by pushing the check valves off the valve seats. The electromechanical bypass can be achieved in a variety of manners, including the use of solenoids, motors and so forth, which can be used to accomplish the goal of opening and closing the system. For example, FIG. 4 shows a closed-loop hydraulic system similar in many respects to the system shown in FIG. 3, with like numbers identifying like elements, and with the addition of a bypass shunt 44 and rotary bypass 46. Shunt 44 must be located between the high and low pressure sides of the system. FIG. 4 also shows charge pump 36 and charge relief valve 52 used to generate increased pressure in the porting system between sump 30 and check valves 31 or 33, and a cooling orifice 38. Charge pump 36 may be driven off of input shaft 24 as is generally known in the art. It is understood that different types of electromechanical bypasses can be used in place of rotary bypass 46. In essence, any means of opening and closing a shunt 44 between the high pressure side and the low pressure side which is triggered by an electrical signal could be used in this invention.

Figure 6:
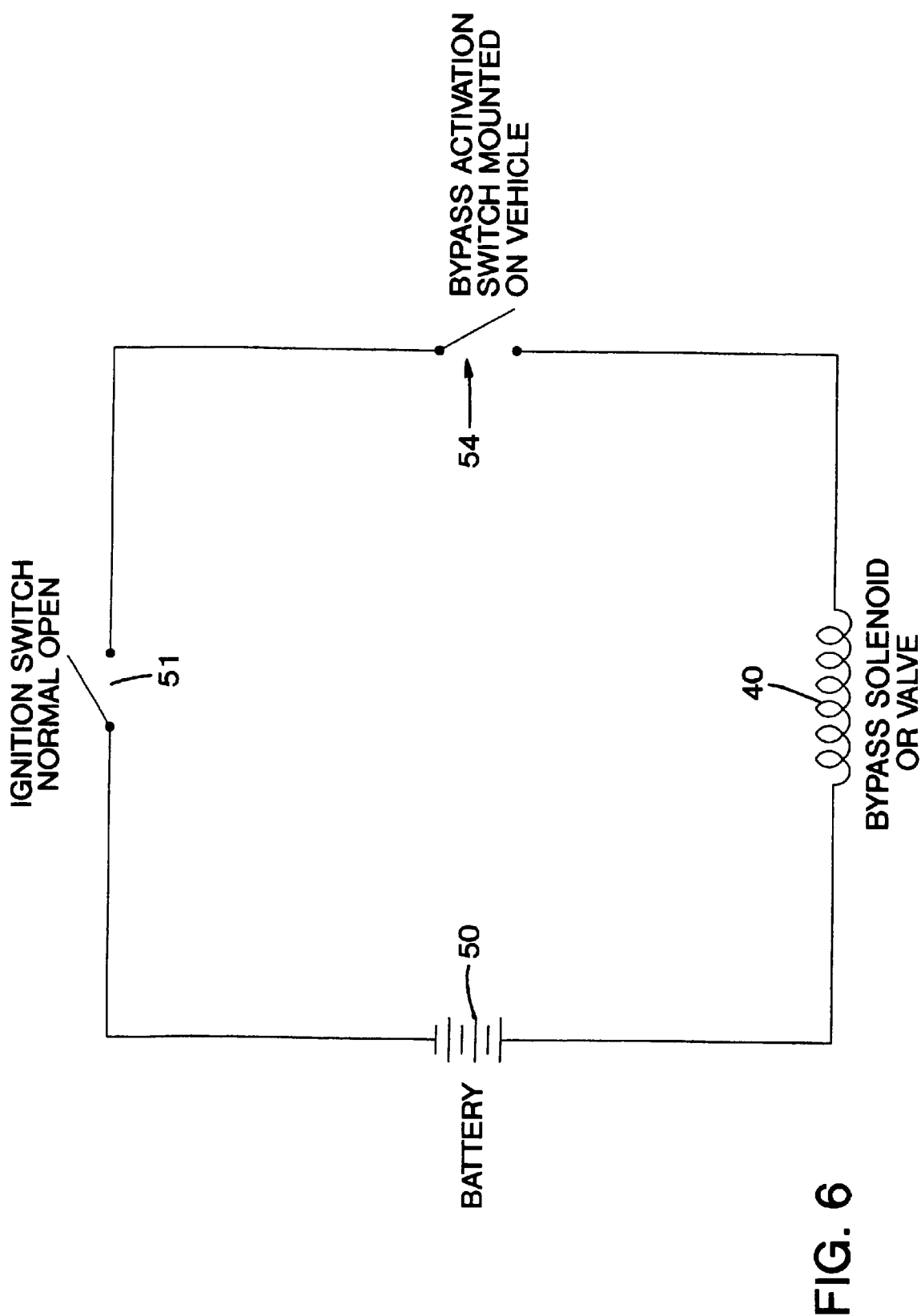
FIG. 6 is an electrical schematic of an embodiment of the invention.
Figure 7:
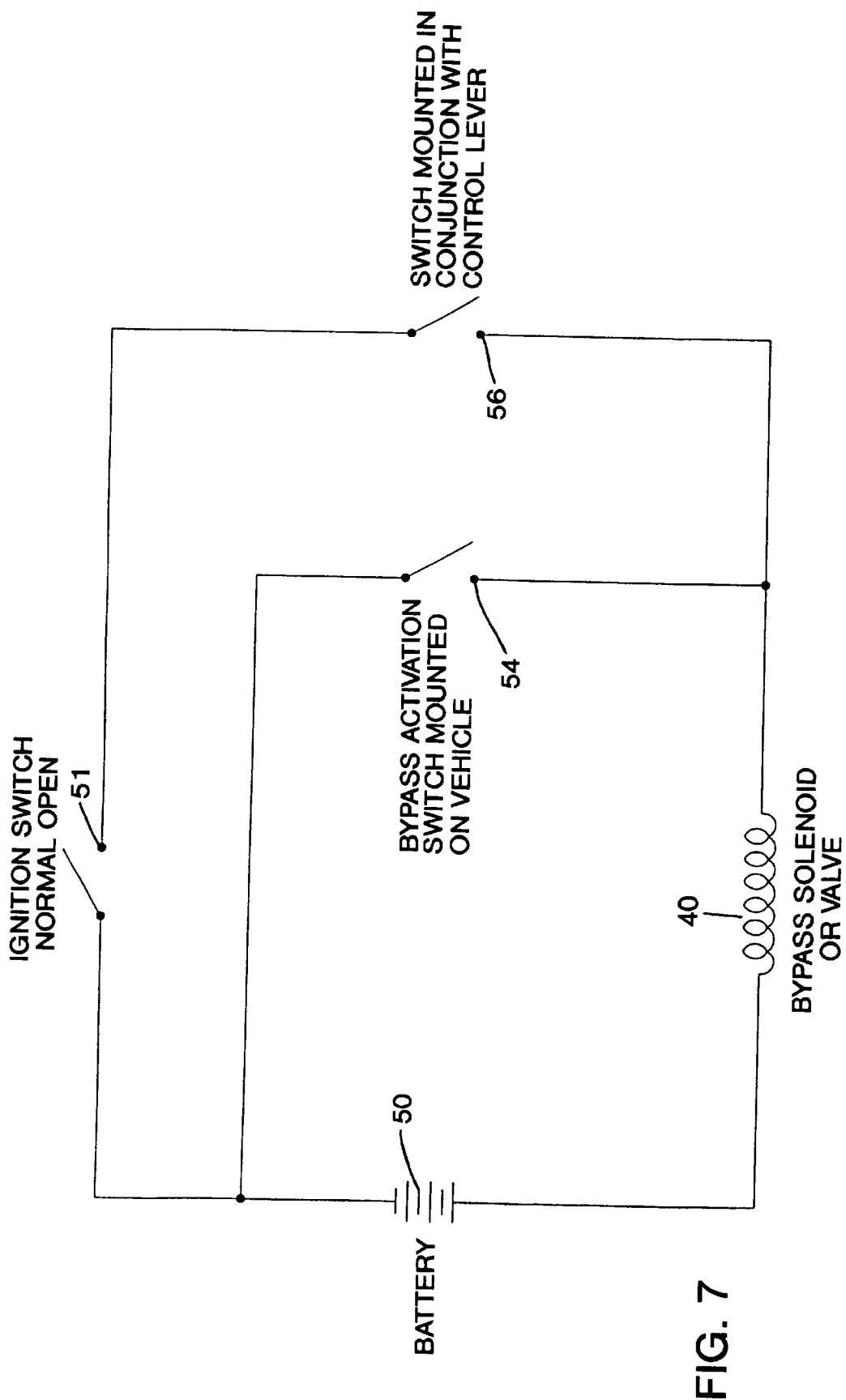
FIG. 7 is an electrical schematic of another embodiment of the invention.
Figure 8:
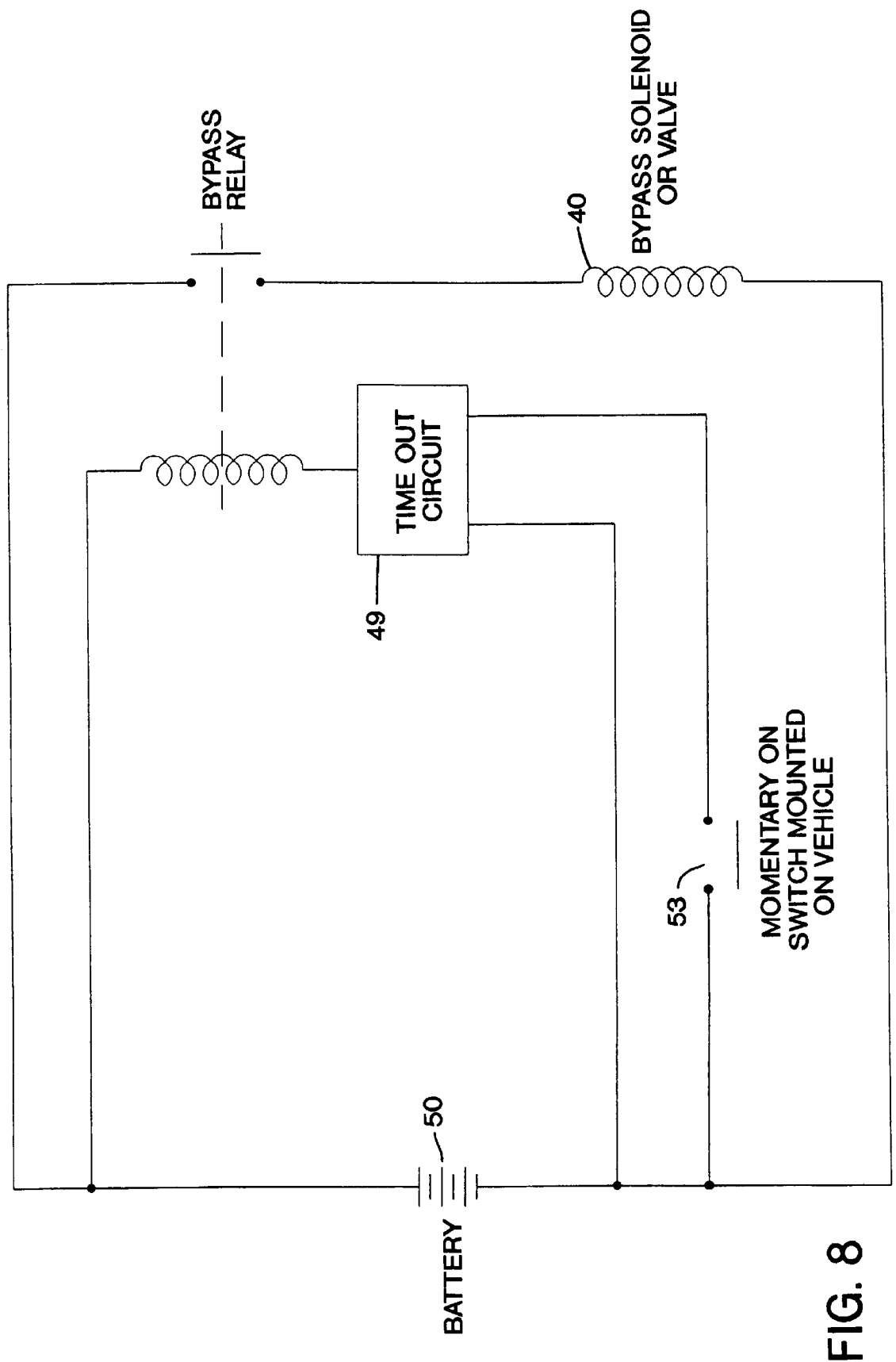
FIG. 8 is an electrical schematic of yet another embodiment of the invention.

FIGS. 6–8 show electrical schematics of different embodiments of the invention where like numerals indicate like elements. FIG. 6 shows a simple circuit with battery 50, ignition switch 51, bypass 40 and bypass activation switch 54 mounted in series so that the bypass switch 54 cannot be activated unless ignition 51 is on, for safety reasons, to prevent freewheeling when the vehicle is off and to eliminate the possibility of a battery drain if the bypass switch is left on. In the alternative embodiment shown in FIG. 7, there is provided a second bypass switch. The two switches could be activated in different manners; e.g., switch 54 could be mounted on the vehicle and second switch 56 could be mounted with and controlled by the control lever 13 in a manner to be described herein. FIG. 8 shows yet another embodiment, including a time out circuit 49 activated by switch 53, which may be mounted on the vehicle. Time out circuit 49, which can be of a type known in the art, may include a clock mechanism to open bypass 40 for a limited period of time, and can include a separate switch to deactivate the bypass.

Figure 9:
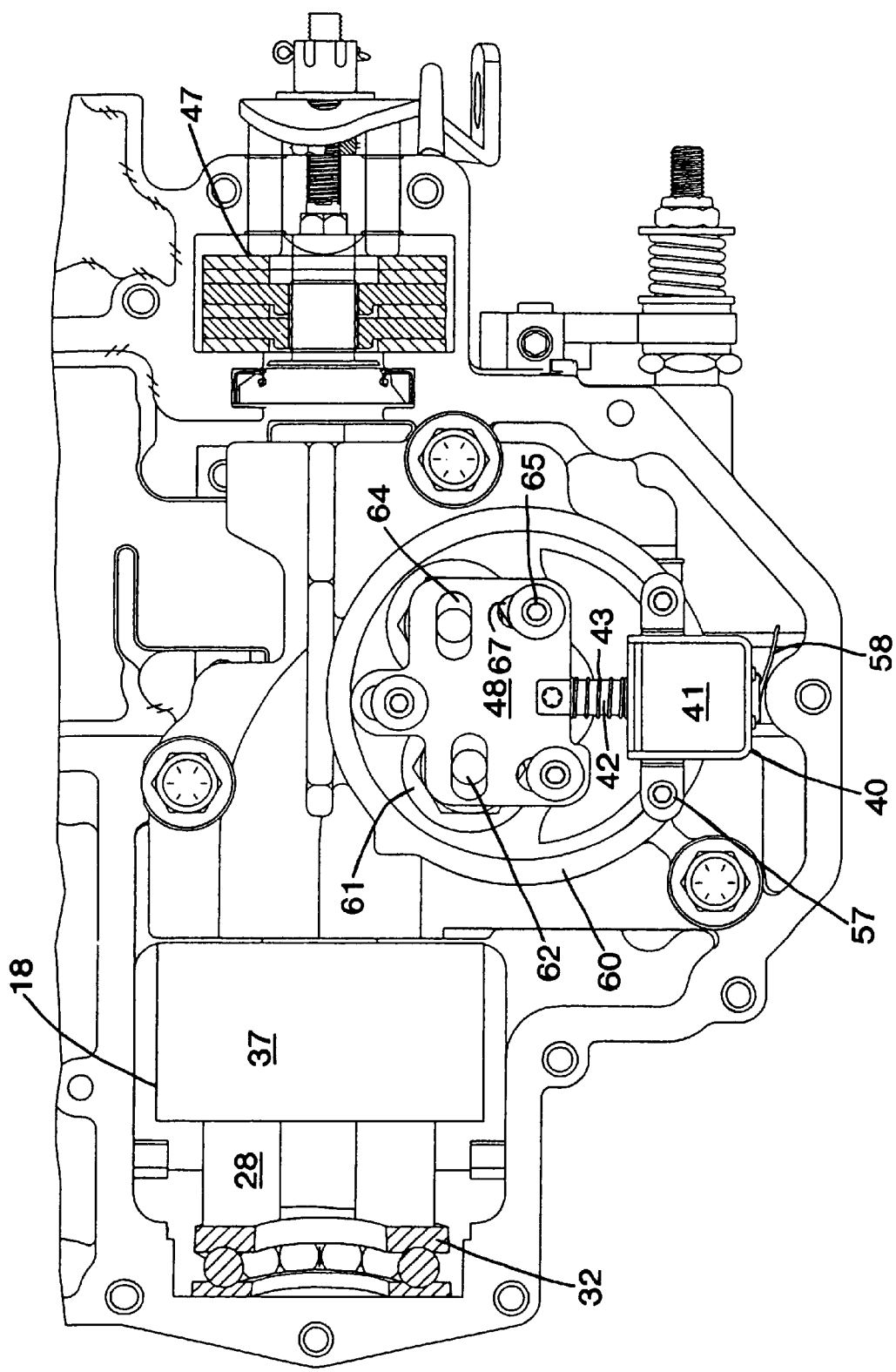
FIG. 9 is a bottom view of a hydrostatic center section mounted in a portion of the transmission housing, showing portions of the transmission in cross-section, and showing a bypass mechanism in accordance with one embodiment of this invention, with the bypass mechanism in the "off" position.
Figure 10:
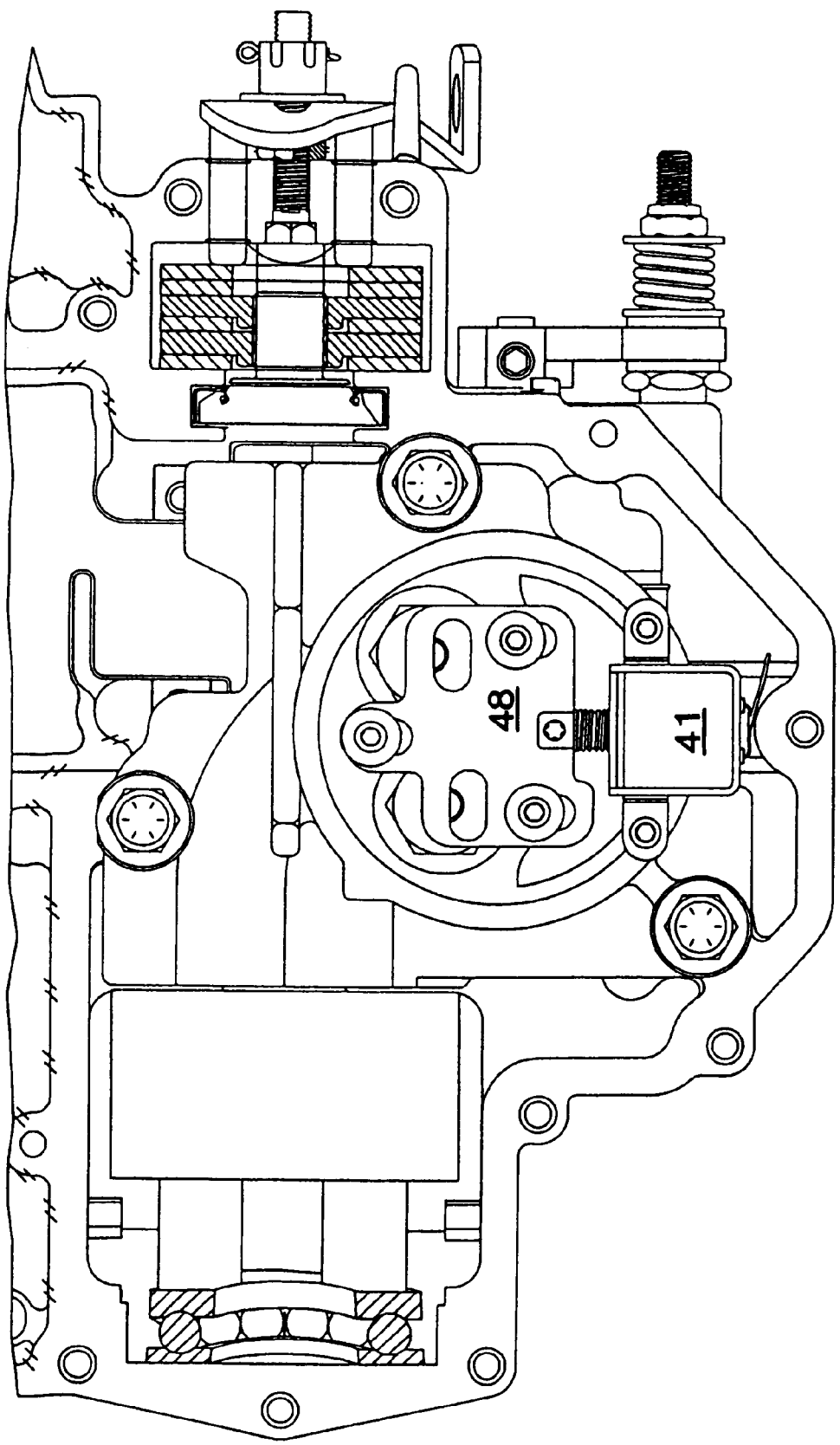
FIG. 10 is a bottom view of the hydrostatic transmission shown in FIG. 9, with the bypass mechanism in the "on" position.
Figure 11:
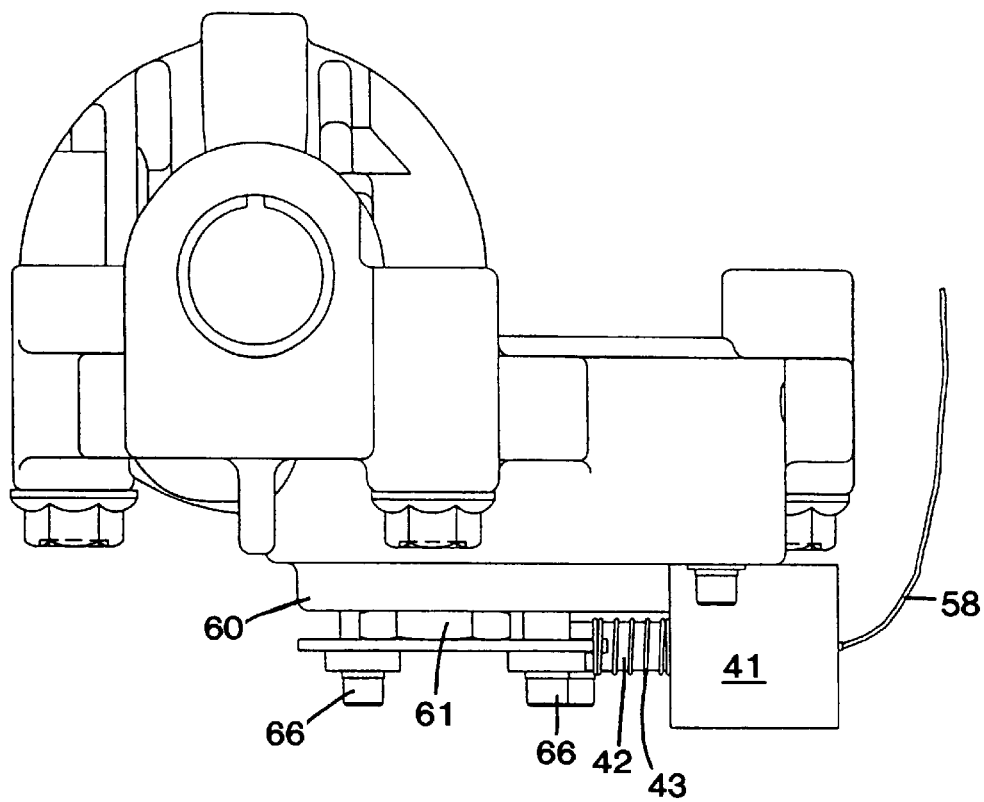
FIG. 11 is an external side view of the center section of the hydrostatic transmission as shown in FIG. 9.

It will be understood from the prior discussion that this invention can be incorporated into an HST or an IHT in a number of ways. For example, FIG. 9 is a cross-sectional plan view of the bottom of an HST incorporating one embodiment of the present invention. Specifically, FIGS. 9–11 show a standard check valve mechanism, including check plugs (or valves) 61 mounted in center section 60; check balls 62 are held in check plugs 61. Electromechanical bypass 40 comprises solenoid 41 and bypass plate 48. Solenoid 41 is a design known in the art and can be secured to center section 60 through a plurality of bolts 57 or other standard methods. It is connected to a switch, not shown in FIG. 9, through solenoid wire 58. Solenoid arm 42 has a spring 43 mounted thereon and is secured to bypass plate 48. Slots 64 are formed in bypass plate 48 to receive check balls 62.

FIG. 9 shows the unit in the "off" or non-bypass position. Screws 65 are mounted in bolt slots 67 in a manner to slidably secure bypass plate 48 to center section 60. As will be understood, the term screw 65 should be read broadly to encompass a variety of methods of securing plate 48 to center section 60. When the solenoid is activated as shown in FIG. 10, plate 48 is pulled towards solenoid 41 by solenoid arm 42. As shown more clearly in FIG. 12, plate 48 thus contacts check balls 62, pushing them off their seat in center section 60 and placing the unit into bypass. Hydraulic fluid contained in chamber 52 internal to check plug 61 can thus exit the check valve 61 past check ball 62 through slot 64 in bypass plate 48. When solenoid 41 is switched to "off," the plate 48 is returned to its "off" position as shown in FIG. 9 via spring 43, thus returning the check valves to their normal operation and restoring the closed circuit. Thus, an HST in accordance with this invention can quickly go in and out of the bypass mode through simple activation of an electronic circuit.

The embodiments shown herein use a standard check plug 61, which can be threaded into center section 60 and include o-ring seals 45. The HST shown in FIGS. 9 and 10 is of a standard design, incorporating motor cylinder block 37 and motor pistons 28 engaging fixed swash plate 32, a brake mechanism 47 is also shown and may be engaged to the motor output shaft (not shown). It should be understood that this invention is not limited to such embodiments, but could also be used with other check valve arrangements, including without limitation use of a separate check plate to hold the check balls against the center section. In addition, any method of moving the plate 48 could be used in connection with this invention.

Figure 12:
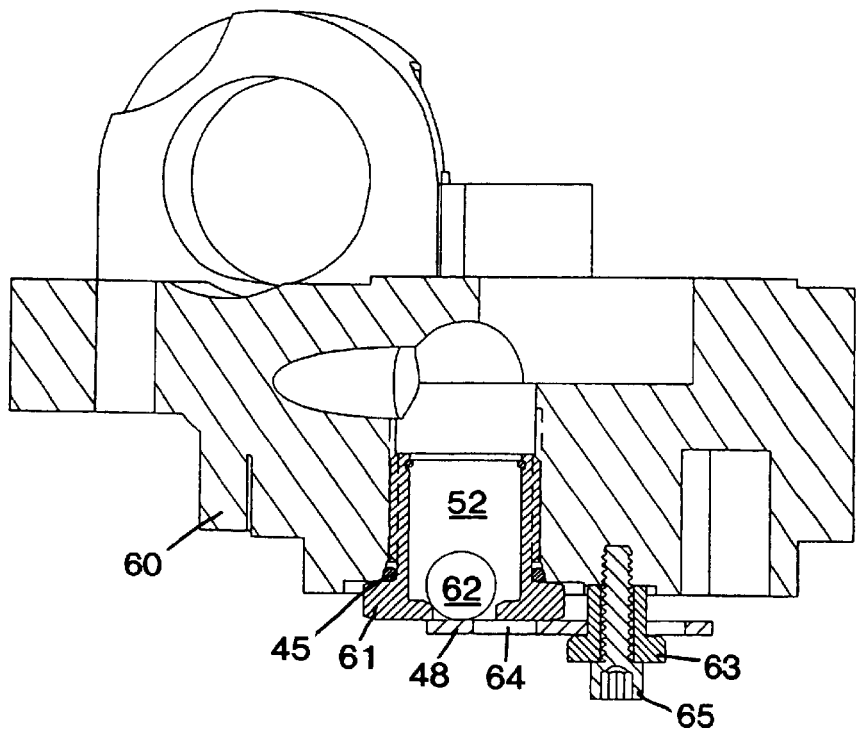
FIG. 12 is a cross-sectional side view of a center section of a hydrostatic transmission as shown in FIG. 10, with the bypass mechanism in the activated position.
Figure 13A:
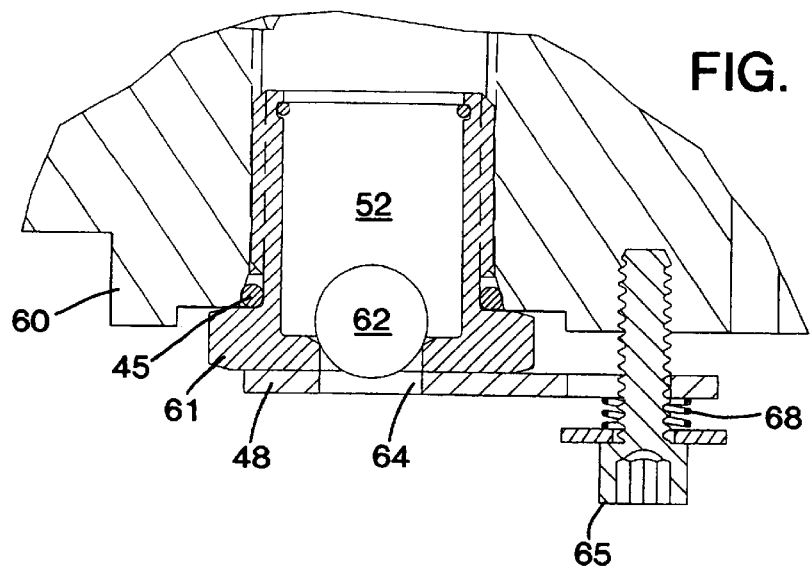
FIG. 13A is a cross-sectional, partial side view of the check valve mounted in the center section of a hydrostatic transmission as shown in FIG. 9, incorporating a different embodiment of the invention, showing the valve in the closed position.
Figure 13B:
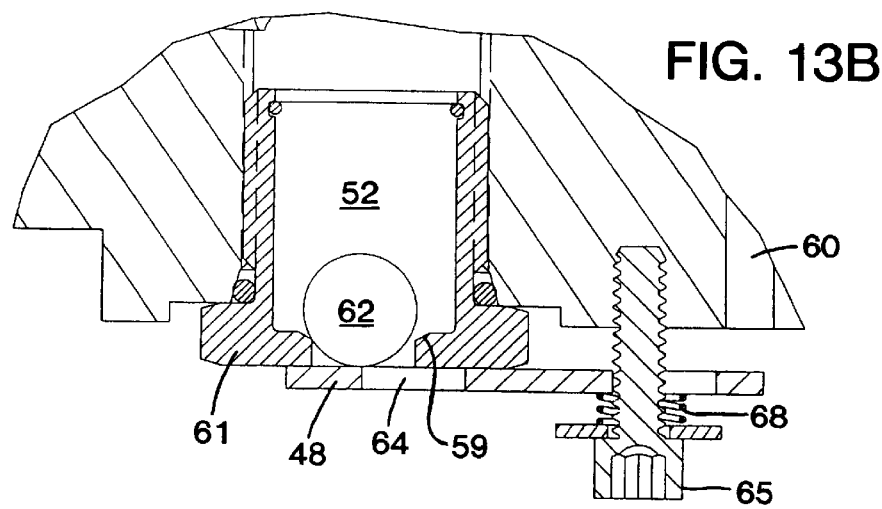
FIG. 13B is a cross-sectional, partial side view of the check valve as shown in FIG. 13A, showing the valve in the open position.
Figure 13C:
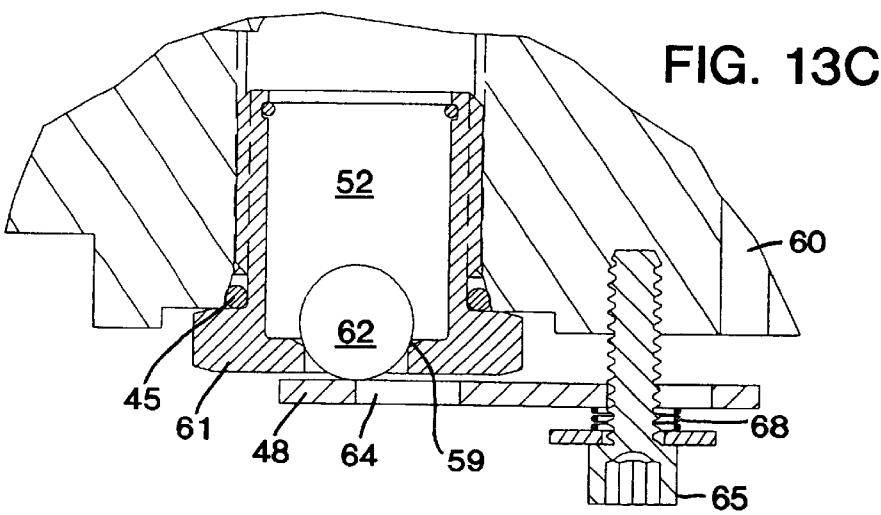
FIG. 13C is a cross-sectional, partial side view of a check valve as shown in FIG. 13A, and also showing the valve in the closed position.

One element of this invention is the manner in which plate 48 is secured to center section 60. As shown in FIG. 12, a fixed height spacer 63 is used with screw 65 to maintain plate 48 the proper distance from center section 60. FIGS. 13A to 13C show an alternative and preferred design of this connection means. Specifically, the fixed height spacer is eliminated and plate 48 is held against check plug 61 by screw 65 which is engaged into center section 60. Spring 68 is secured to screw 65 between the head thereof and plate 48 and acts to maintain plate 48 flat against the bottom surface of check plug 61. In the preferred embodiment three screws 65, each with a spring 68, would be used. In FIG. 13A check ball 62 is in the normal closed position. In FIG. 13B, plate 48 has been moved to dislodge ball 62 and allow the flow of fluid out of chamber 52, achieving full bypass of the system. As can be seen, spring 68 is uncompressed in FIG. 13B. As fluid flow increases, the pressure on ball 62 also increases, forcing plate 48 away from valve 61, thus allowing ball 62 to reseat on internal seat 59, as shown in FIG. 13C, thus closing the bypass.

Springs 68 also act to prevent excessive free-wheeling of the vehicle. If, for example, the vehicle is running downhill in the bypass mode, there would be no hydraulic braking to slow the vehicle, resulting in a potential safety hazard. In such a situation, hydraulic fluid would exit chamber 52 of the check valves, passing through slots 64 of bypass plate 48 with increasing force. At some point, the force of hydraulic fluid on plate 48 as it is discharged from the hydraulic circuit, acting on the check ball 62, will overcome the compressive force of springs 68, and check ball 62 will act to lift plate 48 off check plug 61, allowing check ball 62 to reseat on internal seat 59, preventing uncontrolled free wheeling through hydraulic braking. The spring constant K of springs 68 can be selected according to the desired point at which flow should be slowed.

Figure 14:
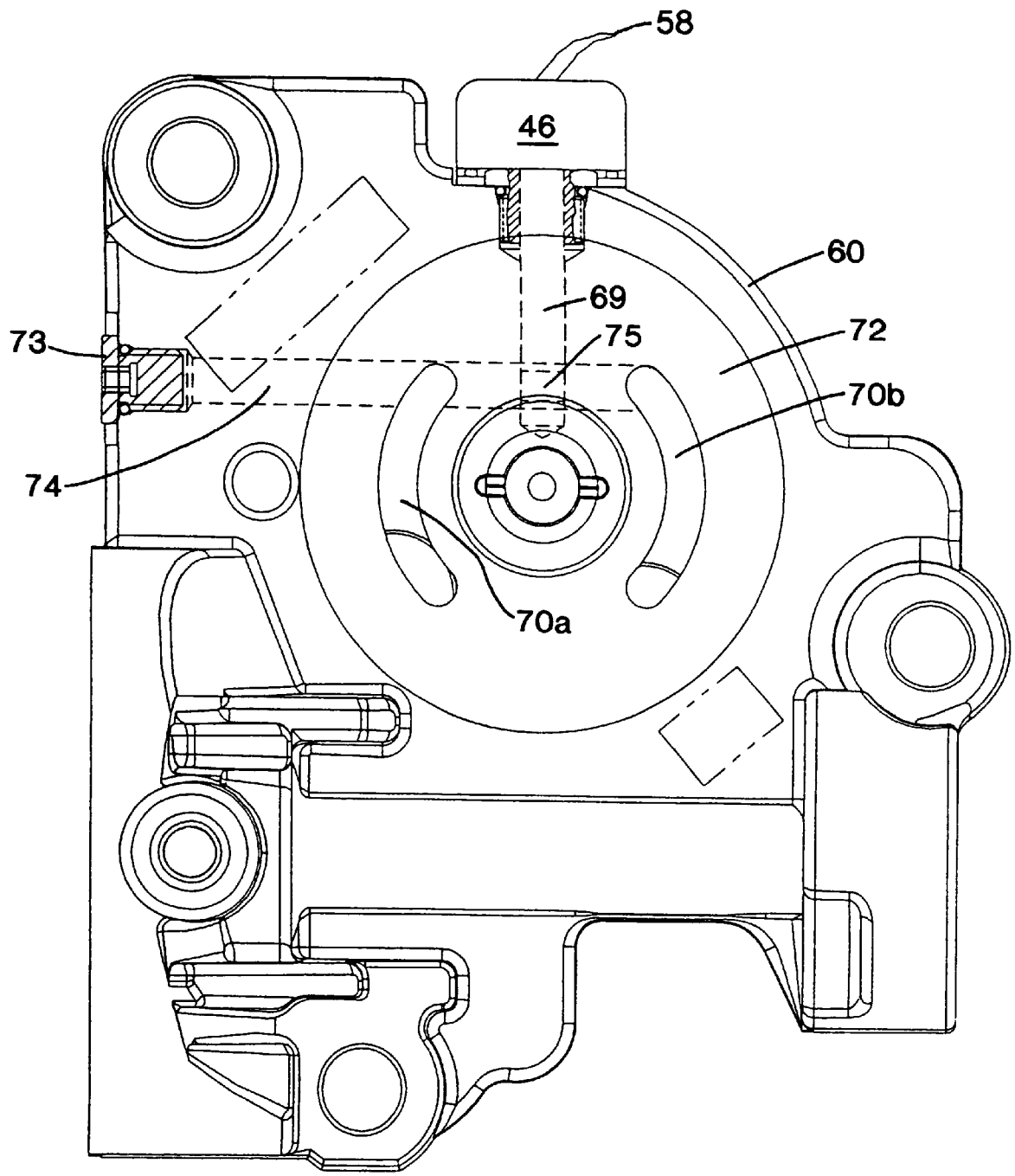
FIG. 14 is a bottom view of a center section of an HST encompassing one embodiment of this invention.
Figure 20:
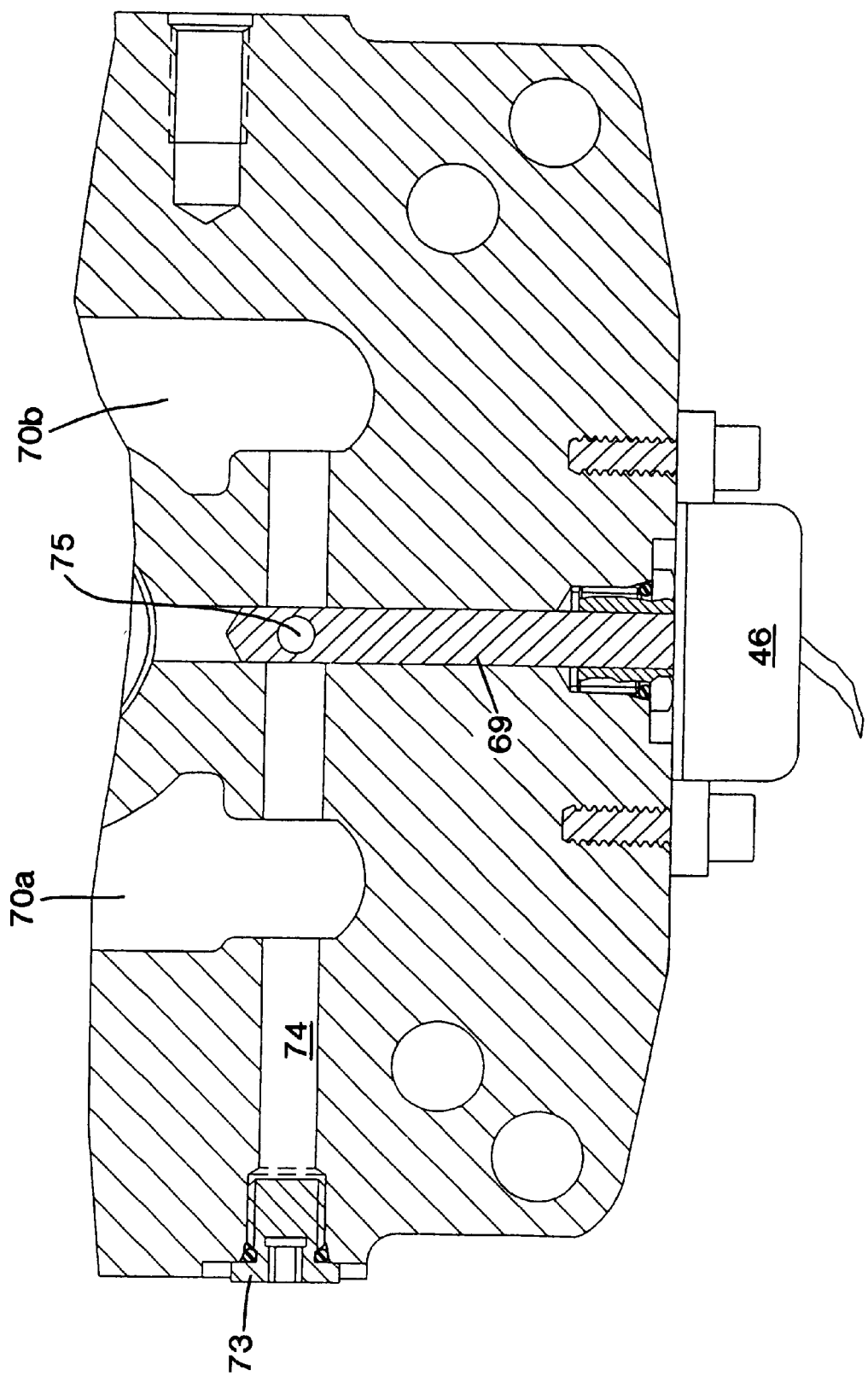
FIG. 20 is a partial cross-sectional view of an HST center section incorporating a rotary bypass actuator in accordance with one embodiment of this invention.

FIGS. 14 and 20 shows an alternative embodiment using a rotary bypass actuator 46 as shown in FIG. 4. Kidneys 70a and 70b are formed on pump running surface 72 of center section 60. Kidneys 70a and 70b form the access between the hydrostatic pump (not shown) and the internal porting comprising the closed loop. A bore 74 can be drilled into center section 60 and closed by cap 73, acting to connect the high pressure and low pressure sides of the closed loop. Rotary actuator 46, which can be of a style known in the art, includes arm 69 rotatably attached thereto. Arm 69 may include passage 75 spaced to allow flow between the two sides of the closed loop. In FIG. 14, arm 69 is in the "on" or "bypass" mode, allowing a connection through passage 75, which can be sized appropriately to control the amount of hydraulic fluid passing therethrough, to prevent uncontrolled discharge. The sizes of the various ports required to prevent uncontrolled discharge will depend upon a variety of factors including, e.g., size of the vehicle, size of the transmission and the expected operating conditions. When rotary actuator is switched "off," as shown in FIG. 20, arm 69 rotates so that passage 75 is perpendicular to bore 74, thus restoring the closed loop system.

Figure 15:
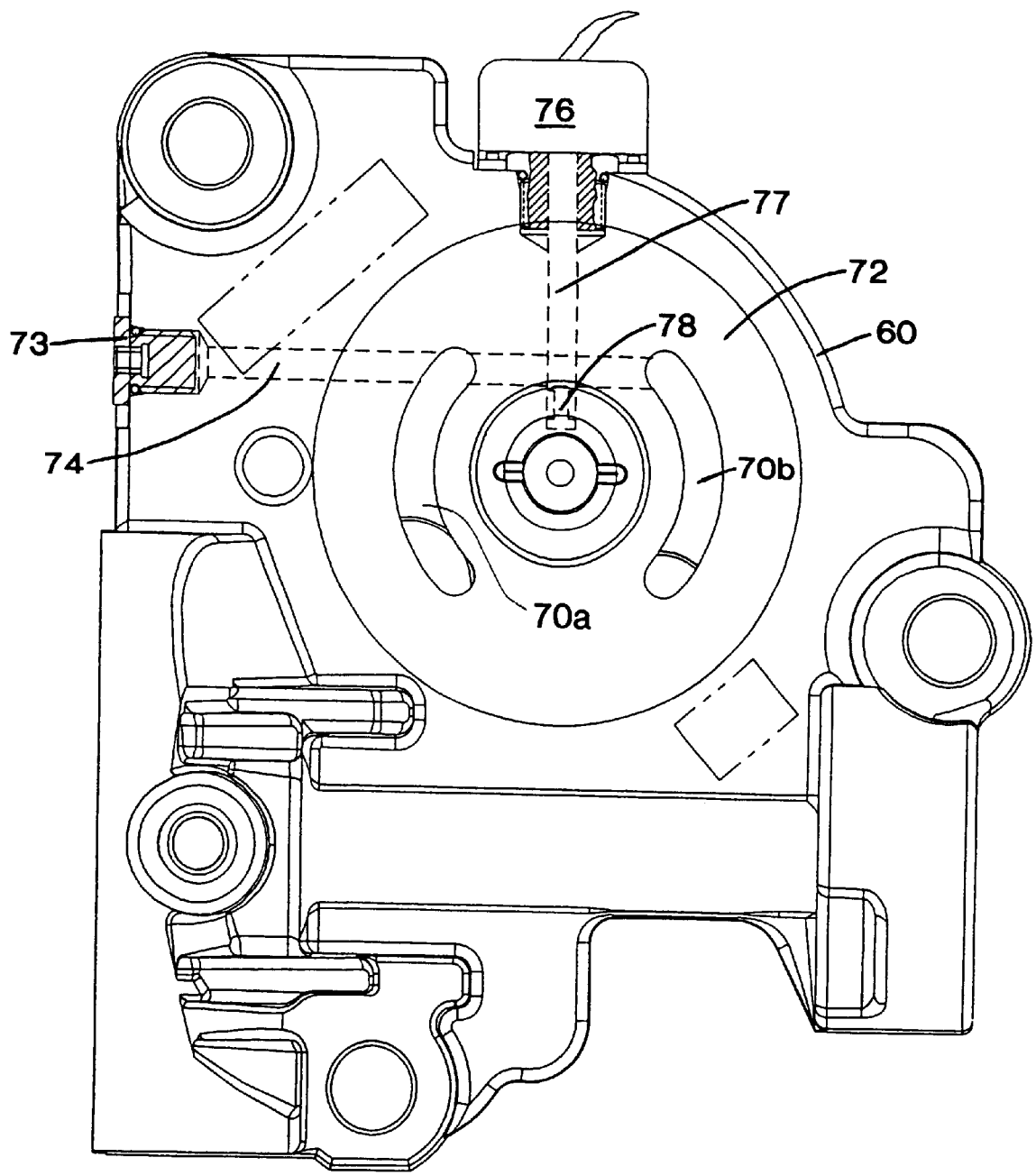
FIG. 15 is a bottom view of a center section of an HST encompassing another embodiment of this invention.

A further alternative embodiment is shown in FIG. 15, in which the bypass actuator is a plunge-type actuator 76 having arm 77 having a first portion with a diameter sufficient to sufficiently block flow in bore 74 between the two sides of the closed loop, and a second portion 78 having a smaller diameter, also sized to allow controlled discharge of hydraulic fluid. When actuator 76 is switched "on," arm 77 is pulled inwards so that arm portion 78 is located within bore 74 to allow flow between the two sides, effectively putting the unit in bypass mode.

Figure 16:
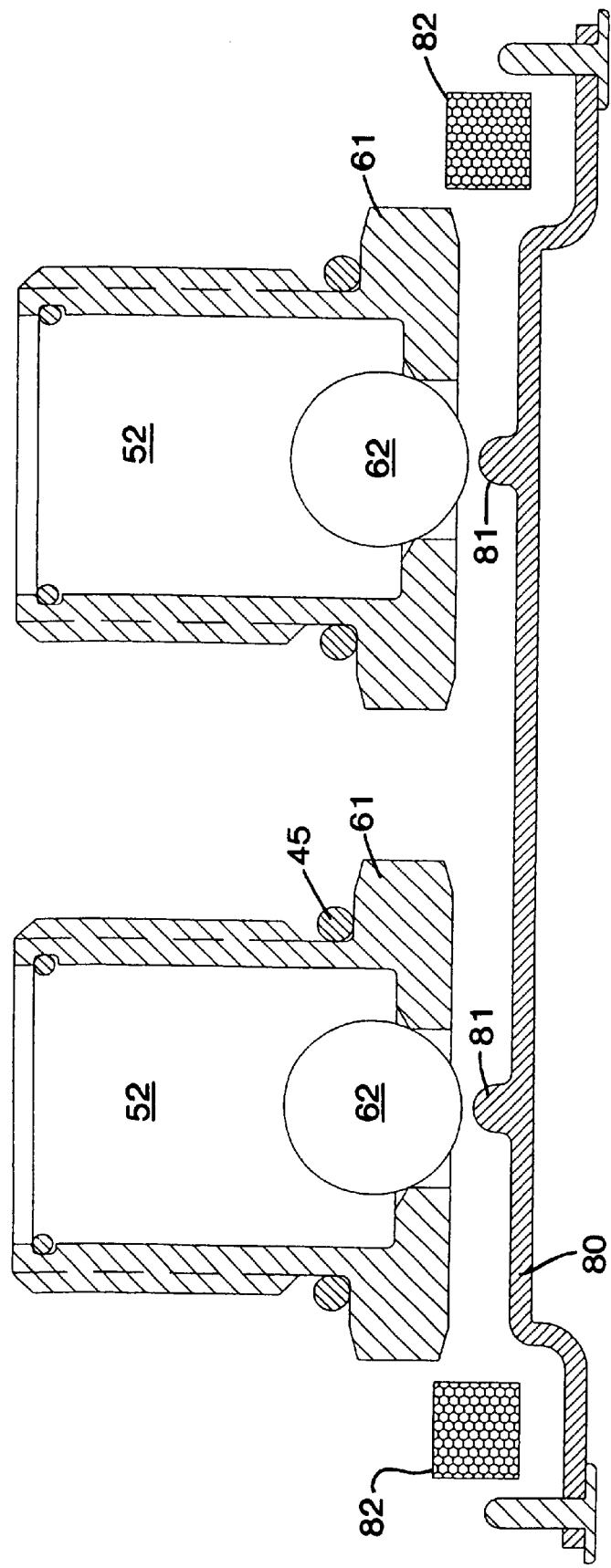
FIG. 16 is a cross-sectional partial view of an embodiment of this invention.

FIG. 16 shows yet another alternative embodiment of the invention, and in particular a further means for displacing the check balls 62 from seat 59 in check plugs 61. Cross plate 80 can be secured to the unit in a known manner to allow movement thereof towards check plugs 31. Projections 81 are formed on plate 80 and spaced to engage check balls 62. When the electrical bypass circuit described herein is switched "on," electromagnets 82 are energized and pull plate towards check plugs 31 so that projections 81 knock the check balls 62 off seats 59, allowing the hydraulic fluid to exit chamber 52 so that the unit enters bypass mode. In such an embodiment, the force required to unseat balls 62 could be fairly substantial and the current required for electromagnet 82 could create undesirable heat in the unit. For such a situation, the unit could incorporate a two stage electrical circuit with a high first current used to overcome the hydraulic resistance and displace balls 62 and a significantly lower second current used to hold plate 80 in place. When the bypass circuit is switched to the "off" position, the plate will be forced back to its original position as shown in FIG. 16 by the force of gravity or through use of springs or other methods known in the art.

Figure 17:
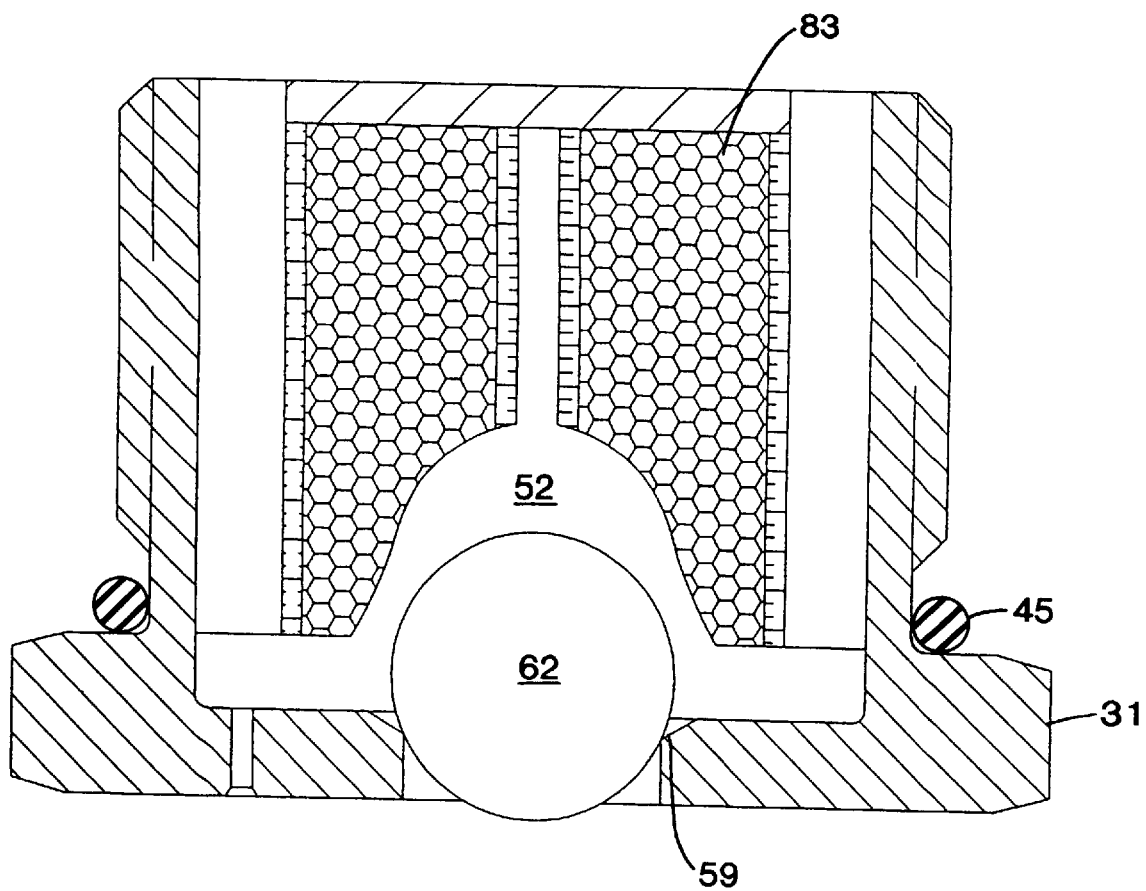
FIG. 17 is a cross-sectional partial view of an embodiment of this invention.
Figure 18:
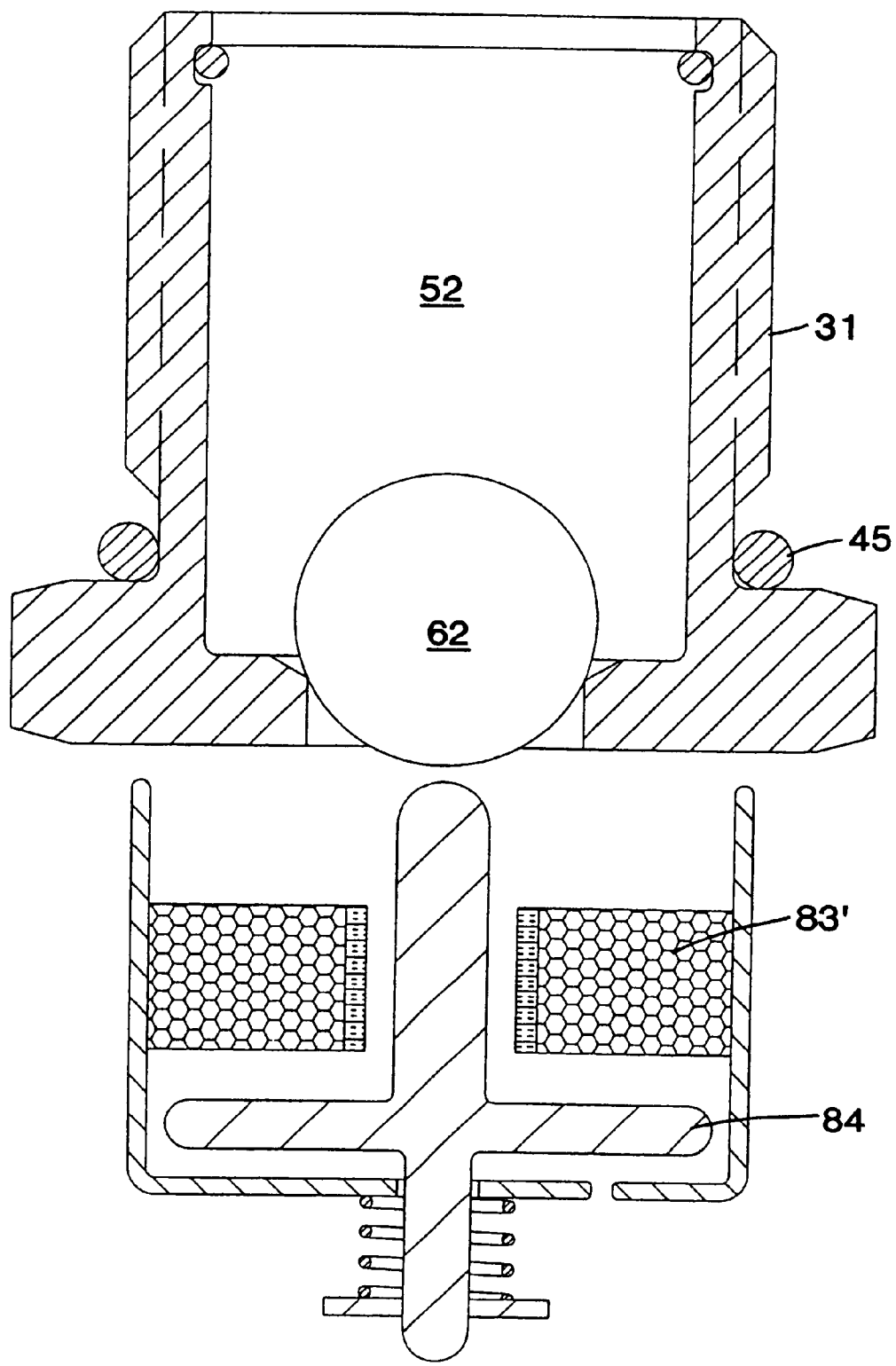
FIG. 18 is a cross-sectional partial view of an embodiment of this invention.

The embodiment shown herein discloses the check balls 62 being pushed off seat 59 to achieve bypass. However, it is understood that bypass could also be achieved by having the check balls 62 pulled off of seat 59, as shown in FIG. 17, by for example an electromagnet 83 mounted internal to said check plug 31 and specifically within chamber 52. Other mechanisms for such a purpose will be obvious to one skilled in the art. Yet another embodiment is shown in FIG. 18, where electromagnet 83 is mounted external to plug 31 and acts to pull member 84 towards it when activated to force ball 62 off seat 59 to achieve bypass.

Figure 19:
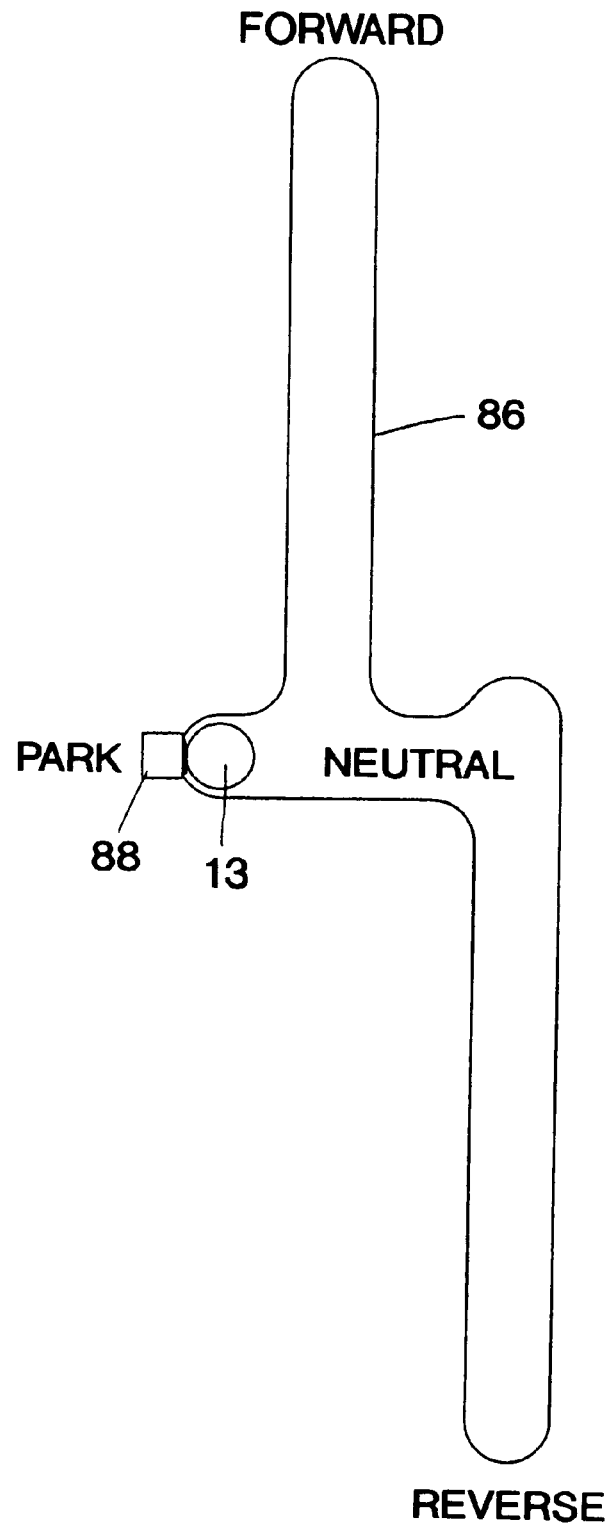
FIG. 19 is a schematic of a control lever shift pattern in accordance with one embodiment of this invention.

The bypass system in accordance with the present invention is preferably activated by a switch engaged by control arm 13. A typical control arm slot 86 is shown in FIG. 19, having forward, neutral and reverse positions. In accordance with the present invention, switch 88 is located in the "neutral" area of the shift pattern, so that it can be optionally activated by the user by moving control arm 13 to the appropriate location adjacent switch 88 to activate it. Switch 88 can be of a design known in the art, so that it is activated by contact with arm 13 or another member actuated by arm 13. By activating switch 88, the bypass feature is activated so that a true "neutral" position is achieved, i.e., the HST is effectively prevented from moving the tractor. This position, which activates switch 88, is effectively a "park" position, as the combination of arm 13 being in neutral and the unit entering full bypass effectively eliminates the possibility of vehicle creepage.

Figure 19A:
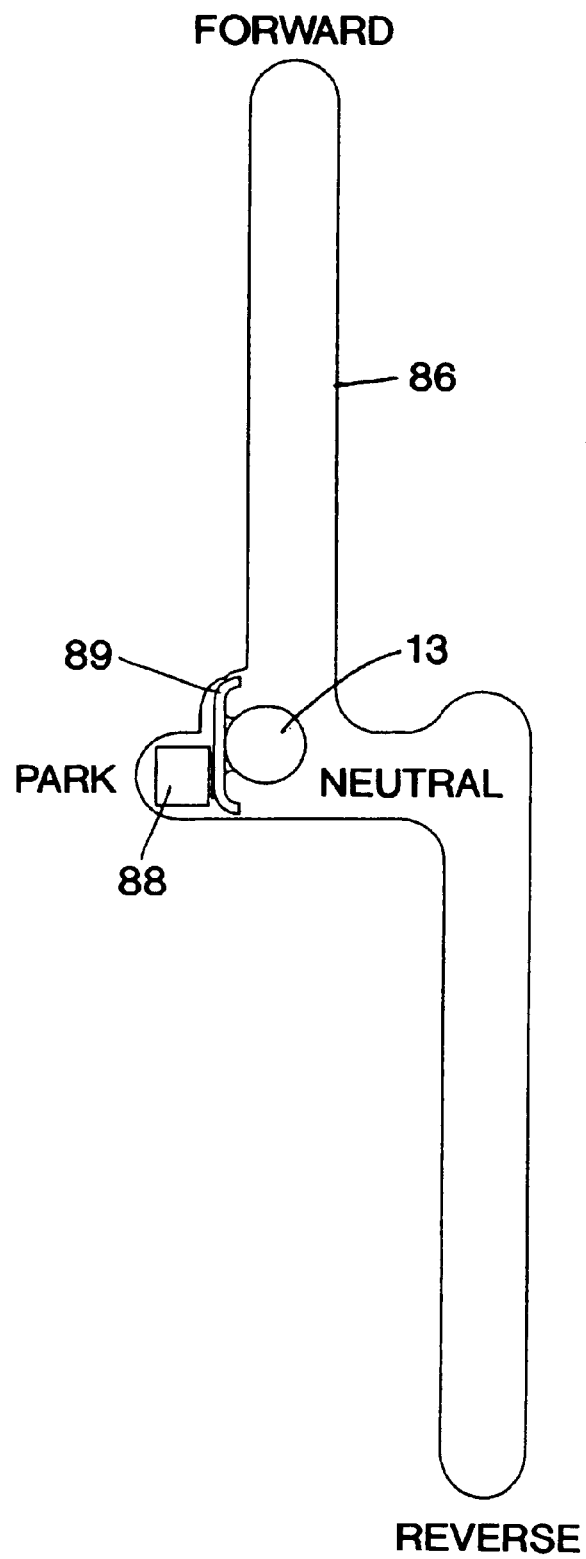
FIG. 19A is a schematic of a control lever shift pattern in accordance with one embodiment of this invention.

As noted above, it is an object of this invention to provide an HST with an improved wider neutral band, to overcome in part problems that may be created when the linkage of the tractor is connected to control arm 14. An alternative embodiment shown in FIG. 19A shows a control arm slot 86 with an enlarged neutral area. Plate 89 is operatively engaged to switch 88 to increase the size of the area where the above-described "park" feature of the HST can be engaged.

Figure 21:
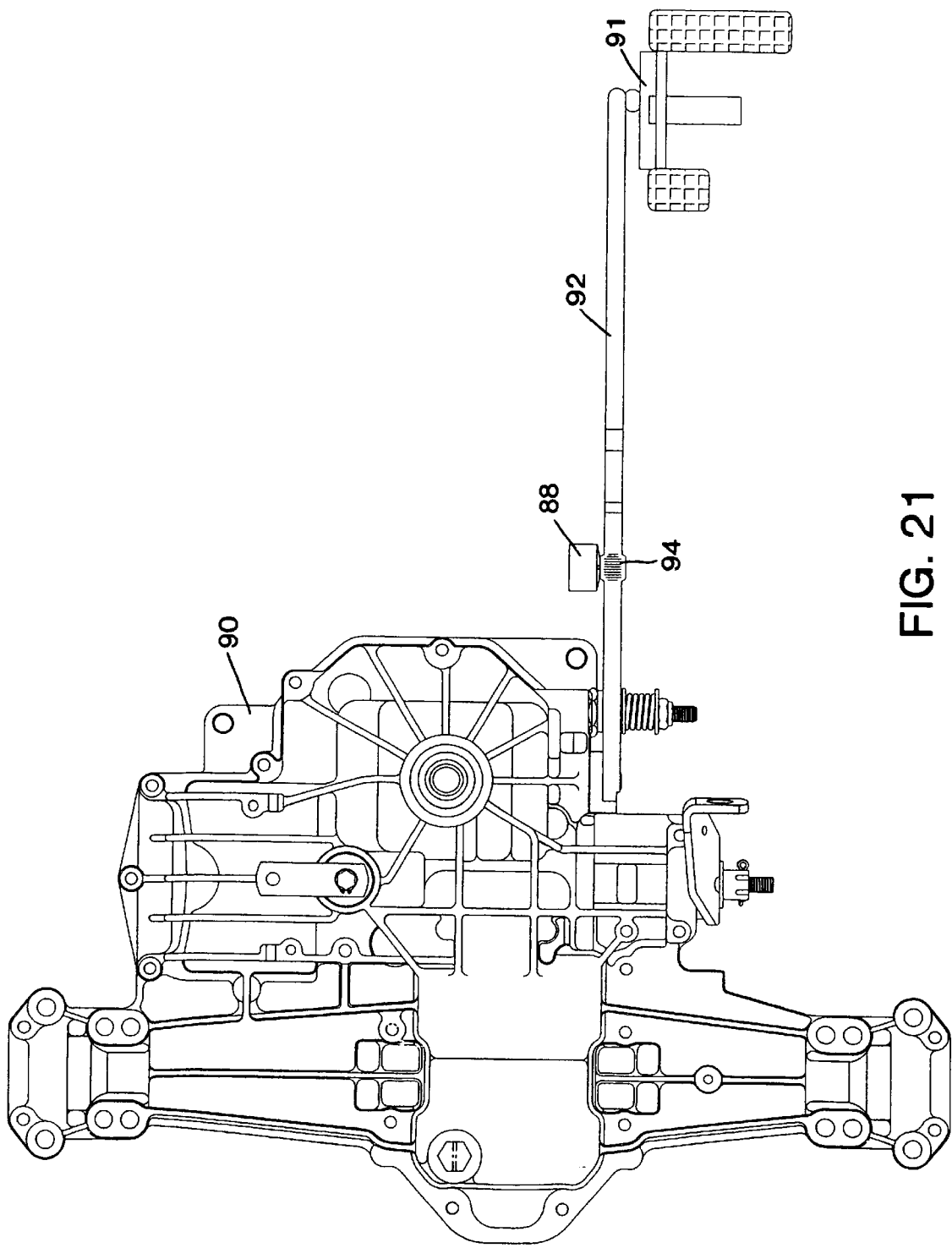
FIG. 21 is a bottom plan view of an integrated hydrostatic transmission incorporating a foot pedal activation of one embodiment of the invention.

FIG. 21 represents yet another embodiment for engaging switch 88 to achieve bypass, through use of a standard foot pedal mechanism 91 engaged to IHT 90 through standard linkage, such as wire rod 92, which is formed with enlarged section 94 placed along the length of rod 92 so as to engage switch 88 when the foot pedal mechanism 91 is moved to the appropriate "neutral" position. Other alternative mechanisms for activating the bypass could be used, and it is understood that this invention should not be so limited. By way of example only, a switch could be located on the tractor on the main control panel or adjacent the tractor seat.

It is to be understood that the above description of the invention should not be used to limit the invention, as other embodiments will be obvious to one skilled in the art. This invention should be read as limited by the scope of its claims only.

We claim:

1. A method for controlling the flow of a hydraulic fluid in a hydrostatic transmission comprising a hydrostatic pump and a hydrostatic motor rotatable on a center section having a hydraulic circuit by which the hydrostatic pump and the hydrostatic motor are in fluid communication, a sump, and an electromechanical valve mechanism connecting the hydraulic circuit to the sump, the method comprising:

circulating the hydraulic fluid through the hydraulic circuit;

receiving at the electromechanical valve mechanism an electrical signal indicative of a desire to enter a bypass state; and in response to the electrical signal, causing the electromechanical valve mechanism to open to thereby divert a portion of the circulating hydraulic fluid from the hydraulic circuit to the sump.

2. The method as recited in claim 1, wherein the electromechanical valve mechanism comprises a check valve carried by the center section and disposed between the hydraulic circuit and the sump.

3. The method as recited in claim 2, wherein the electromechanical valve mechanism further comprises a solenoid, the solenoid pushing the check valve to an open state in response to the electrical signal.

4. The method as recited in claim 3, wherein the electromechanical valve mechanism further comprises a plate disposed between the solenoid and the check valve, the solenoid pulling the plate against the check valve in response to the electrical signal such that the plate pushes the check valve to the open state.

5. The method as recited in claim 2, wherein the electromechanical valve mechanism further comprises an electromagnet, the electromagnet moving the check valve to an open state in response to the electrical signal.

6. The method as recited in claim 5, wherein the electromechanical valve mechanism further comprises a plate disposed between the electromagnet and the check valve, the electromagnet pulling the plate against the check valve in response to the electrical signal such that the plate pushes the check valve to the open state.

7. The method as recited in claim 1, further comprising starting a count-down timer in response to the electrical signal and, once the count-down timer reaches zero, causing the electromechanical valve to close.

\* \* \* \* \*